United States Patent
Brunner et al.

(10) Patent No.: US 7,441,365 B2
(45) Date of Patent: Oct. 28, 2008

(54) DEER ATTRACTING APPARATUS

(76) Inventors: Larry Thomas Brunner, 3286 W. County Rd., 325 South, Versailles, IN (US) 47042; Rae Jean Brunner, 3286 W. County Rd., 325 South, Versailles, IN (US) 47042

( * ) Notice: Subject to any disclaimer, the term of this patent is extended or adjusted under 35 U.S.C. 154(b) by 903 days.

(21) Appl. No.: 10/918,870

(22) Filed: Aug. 16, 2004

(65) Prior Publication Data
US 2006/0032104 A1 Feb. 16, 2006

(51) Int. Cl.
*A01M 31/06* (2006.01)
(52) U.S. Cl. .................................. 43/2; 43/1
(58) Field of Classification Search ............ 43/1, 43/2; 446/330, 331; 273/403, 407, 408; D22/125
See application file for complete search history.

(56) References Cited

U.S. PATENT DOCUMENTS

| | | | |
|---|---|---|---|
| 4,773,178 A * | 9/1988 | Marek | 43/2 |
| 5,029,408 A | 7/1991 | Smith | |
| D325,617 S * | 4/1992 | Smith | D22/125 |
| 5,335,438 A * | 8/1994 | Terrill | 43/1 |
| 5,546,692 A * | 8/1996 | Byers | 43/2 |
| 5,632,110 A * | 5/1997 | Roy | 43/2 |
| 5,791,081 A * | 8/1998 | Turner et al. | 43/2 |
| 5,826,364 A * | 10/1998 | Bitting | 43/2 |
| 6,021,594 A | 2/2000 | Krueger | |
| 6,487,810 B1 | 12/2002 | Loughman | |
| 6,510,644 B1 * | 1/2003 | Gollnik | 43/2 |
| 6,532,693 B2 | 3/2003 | Sides | |
| 6,715,228 B1 | 4/2004 | Price | |
| 2003/0106253 A1 | 6/2003 | Loughman | |

OTHER PUBLICATIONS

"Tail-Wagger Deer Rear," available online at http://www.tail-wagger.com/deerrear.htm, Apr. 9, 2004, (2 pages).
Falling for Fishing Hook, Line & Sinker, Hunting & Fishing Gear Review, available online at http://www.hunting-fishing-gear.com/article-display/523.html, Apr. 9, 2004, (2 pages).

* cited by examiner

*Primary Examiner*—Kurt Rowan
(74) *Attorney, Agent, or Firm*—Maginot, Moore & Beck

(57) ABSTRACT

A game attracting apparatus comprises a pole, a flag and an actuator. The pole has a lower end and a top end displaced from the lower end. The flag includes a tip, a mounting location, an outer side and an underside. The flag is configured to resemble the shape and color of a deer's tail when viewed from the underside and is mounted at the mounting location to the pole at a location above the lower end. The actuator is coupled to the flag adjacent the tip of the flag. The flag, pole and actuator are configured to induce the flag to hang from the pole with the tip downward so that the outer side is presented toward a desired direction when the actuator is not actuated and so that, during actuation of the actuator, the tip of the flag moves upwardly so that the underside of the flag is presented toward the desired direction.

20 Claims, 4 Drawing Sheets

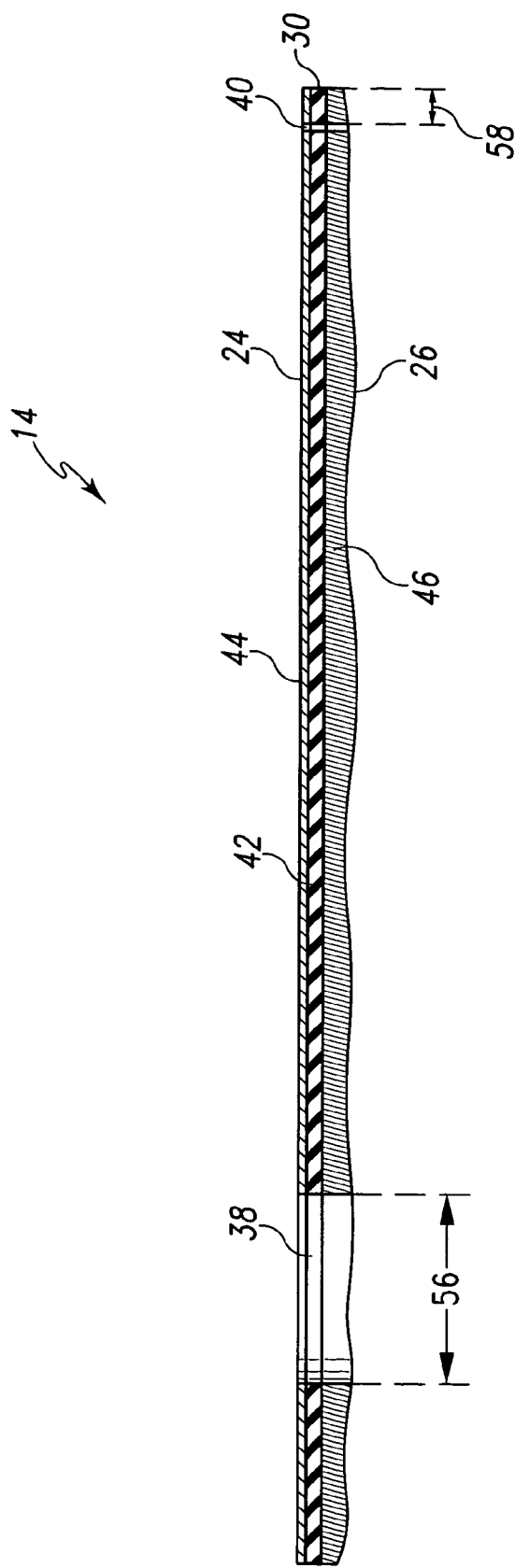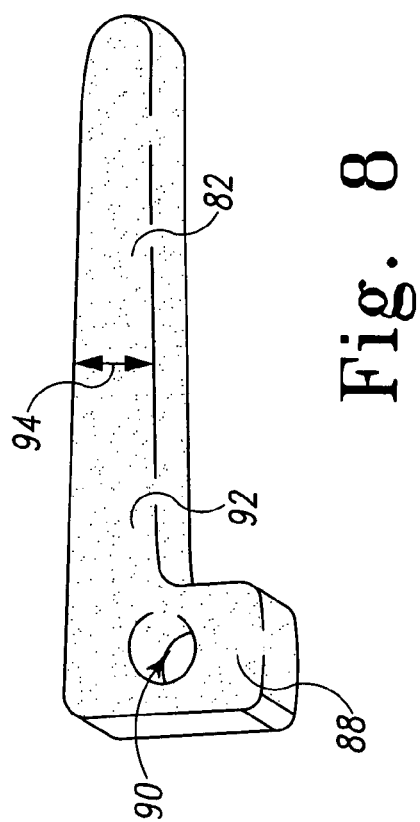

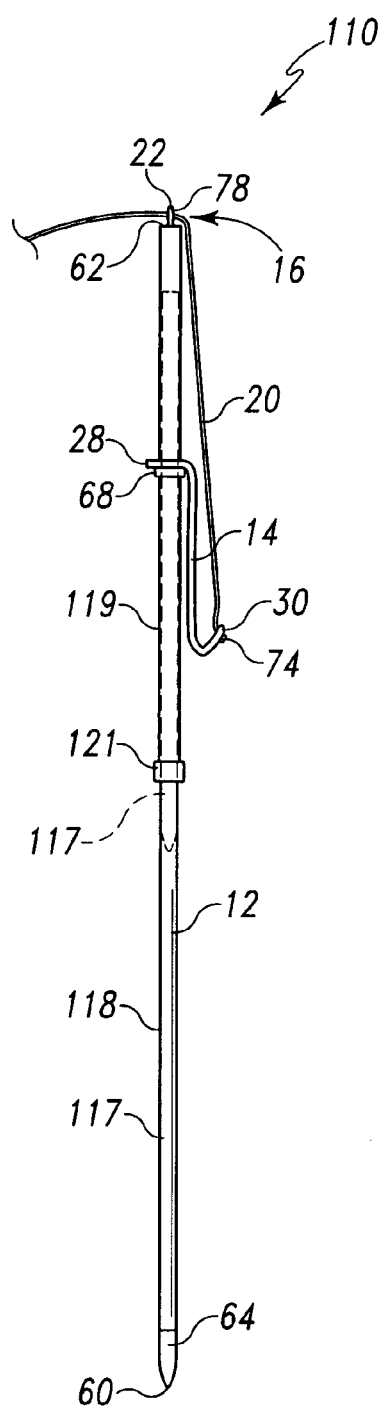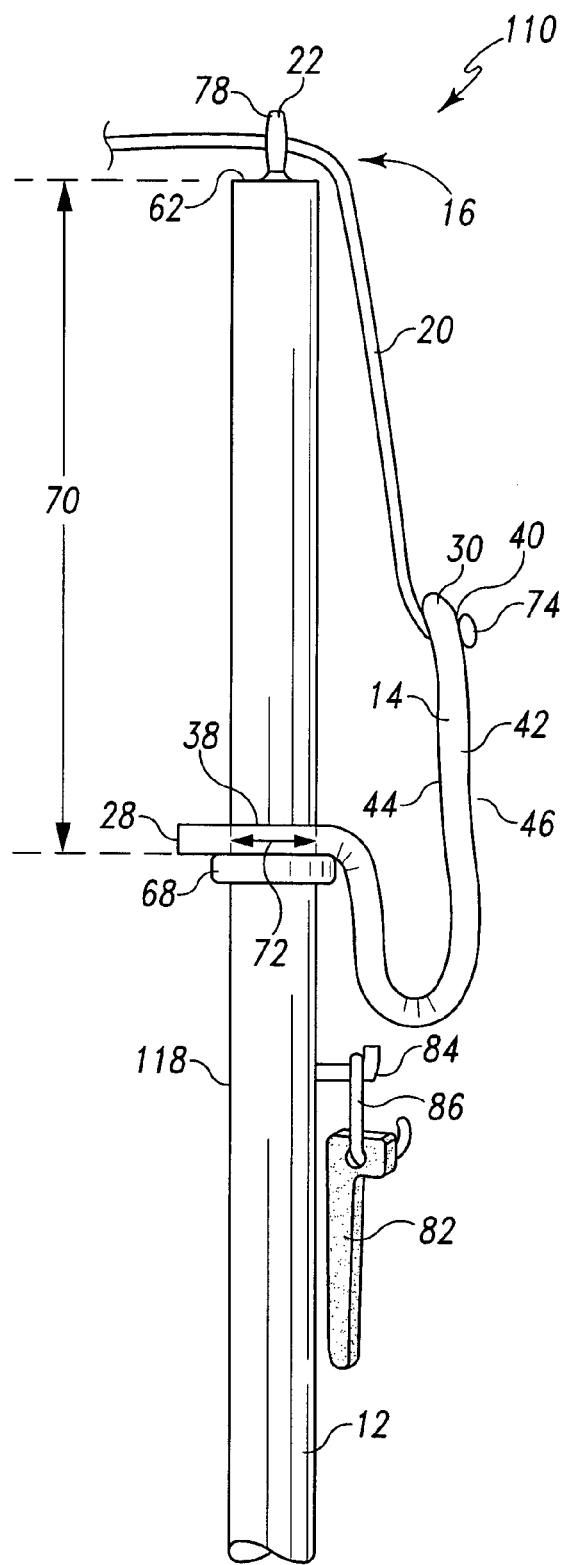
Fig. 6
Fig. 7

DEER ATTRACTING APPARATUS

BACKGROUND AND SUMMARY

This device relates to attractants for deer and more particularly to portable devices simulating tail wagging by a doe for attracting a buck.

Deer species communicate in a number of ways: through a wide variety of body postures and movements to communicate by sight; through a number of scents and scent organs to communicate by smell; through sound by vocalization, blowing through the nostrils and thrashing branches. Deer, and in particular white tail deer (so named because their tails have a 4-10 inches white underside), use their tails as a visual means of communication with other deer. When a deer suspects trouble it will hold its tail out at about 90 degrees. This signal warns nearby deer that danger is suspected. Deer hold their tails erect like a flag exposing the underside of the tail when the animal is alarmed or running. Deer use a tail waving motion as they flee, probably to warn other deer of danger, and to show other deer which way the flagger is going. For example, mature does will flee an area of danger waving their white flags as they depart to provide a ready reference for her young fawns as they attempt to follow her. When a lead deer flees an area of danger, the tail remains up so the herd can follow the lead deer. Deer also use their tails to communicate with each other in other ways. For example, grown deer wag their tails to signal no danger. Fawns, much like dogs, will wag their tails to signal that they are happy. Does will raise their tails to signal that they are ready to breed.

It is well known that does in heat display their readiness for breeding by raising their tail to expose their rump and consequently the white fluffy underside of their tails. The muscles and tendons in a deer's tail induce the tail to curve upwardly rather than to simply pivot about the base of the tail. Bucks recognize, and are attracted to, the does' tail raising display.

Hunters have devised many decoys that attempt to simulate the tail wagging displays of deer in an attempt to attract deer to harvest. Many deer decoys exist that utilize movement of a deer tail-shaped device to attempt to attract deer. Some such decoys may be as simple as a wind blown suspended deer tail shaped device such as that disclosed in Gollnik, U.S. Pat. No. 6,510,644. Other decoys, such as that disclosed in Terrill, U.S. Pat. No. 5,335,438 utilize a rotatable, tether actuated, hinged rigid deer tail-shaped device whose inner surfaces bear indicia representative of the rump patch and/or flag of a whitetail deer. Some more complex devices, such as that disclosed in Smith, U.S. Pat. No. 5,029,408, utilize a mechanical movement generator for moving a deer tail-shaped device in an arcuate motion. Other more complex decoys attach a deer tail-shaped device to a deer rump-shaped body such as the device disclosed in Byers, U.S. Pat. No. 5,546,692 or attach a deer tail-shaped device to a doe-shaped body such as the device disclosed in U.S. Pat. No. 6,021,594. While all of these devices may be more or less effective in attracting deer, each exhibits deficiencies.

All deer attracting devices must be transported to, and utilized in, the hunting grounds, and thus, large or complicated mechanical devices may be inconvenient to utilize in the hunting grounds. Many of the deer attractants simulate tail motions that might communicate alarm or that danger is suspected. None of the described devices repeatedly mimic the curling motion of a doe's tail when they are signaling their willingness to bread.

Hunters would appreciate a simple to operate compact deer attractant that mimics the tail display motion of a doe in heat.

The chemical message for reproductive readiness is transmitted via the urine. Does often intentionally mark themselves with their own urine when they are in heat. Many scents are commercially available that contain urine of a doe in heat. While the urine of a doe in heat can alone attract bucks, hunters would appreciate a device upon which such doe urine can placed that replicates the tail display motion of a doe in heat.

The disclosed device is a compact, lightweight, simple, easily operated device that mimics the tail curling motion of a doe in heat. The device can easily be transported to, set up in, and operated at a desired hunting location.

According to one aspect of the invention, a deer attracting apparatus includes a flexible deer tail shaped device or a flag, a mount and an actuator. The flag is a flexible flag including a tip, a mounting location, an outer side and an underside. The flexible flag is configured to resemble the shape of a deer's tail when viewed from the underside and is mounted at the mounting location to the mount. The actuator is coupled to the flexible flag adjacent the tip. The flag, mount and actuator are configured to induce the flag to hang from the mount with the tip downward so that the first side is presented toward a desired direction when the actuator is not actuated and during actuation of the actuator, the tip of the flag moves upwardly in a curling fashion that induces the first side of the flag adjacent the tip portion to face the first side of portions of the remainder of the flag and the underside of the flag adjacent the tip portion to be presented toward the desired direction.

According to another aspect of the disclosure, a deer attracting apparatus comprises a pole, a flexible flag and an actuator. The pole has a ground engaging end configured for insertion into soil, a top end displaced from the ground engaging end when the pole is in a use configuration by a length greater than the height of a deer's hind quarters and a stop disposed between the ground engaging end and the top end at a height above the ground engaging end approximating the height of a deer's hind quarters when the ground engaging end is received in the soil. The flexible flag includes a tip, a mounting location, an outer side and an underside. The flexible flag is configured to resemble the shape of a deer's tail when viewed from the underside and is mounted at the mounting location to the pole adjacent the stop. The underside includes a material having a texture and color simulating the texture and color of a deer's tail. The actuator comprises a guide mounted adjacent the top end of the pole and a line coupled at a first end adjacent the tip of the flag and a free end located remotely from the pole. Between the free end and the first end, the line is guided by the guide. The flexible flag, pole and actuator are configured to induce the flag to hang from the pole with the tip downward so that the first side is presented toward a desired direction when the actuator is not actuated and during actuation of the actuator, the tip of the flag moves upwardly in a curling fashion that induces the first side of the flag adjacent the tip portion to face the first side of portions of the remainder of the flag and the underside of the flag adjacent the tip portion to be presented toward the desired direction.

According to yet another aspect of the disclosure, a game attracting apparatus comprises a pole, a flag and an actuator. The pole has a lower end and a top end displaced from the lower end. The flag includes a tip, a mounting location, an outer side and an underside. The flag is configured to resemble the shape and color of a deer's tail when viewed from the underside and is mounted at the mounting location to the pole at a location above the lower end. The actuator is coupled to the flag adjacent the tip of the flag. The flag, pole and actuator are configured to induce the flag to hang from the pole with the tip downward so that the outer side is presented toward a desired direction when the actuator is not actuated and so that, during actuation of the actuator, the tip of the flag moves upwardly so that the underside of the flag is presented toward the desired direction.

Additional features and advantages of the present invention will become apparent to those skilled in the art upon consideration of the following detailed description of preferred embodiments exemplifying the best mode of carrying out the invention as presently perceived.

BRIEF DESCRIPTION OF THE DRAWINGS

The illustrative devices will be described hereinafter with reference to the attached drawings which are given as non-limiting examples only, in which:

FIG. 5 is a sectional view of the flag taken along line 5-5 of FIG. 4;

FIG. 6 is a side elevation view of a telescopically mounted deer attracting apparatus similar to the attracting apparatus of FIG. 1 except for the telescoping pole showing the device during actuation but prior to reaching its fill flagging position showing how the tip of the flag is raised upwardly and the portions of the remainder of the flag curl and showing the pole in a retracted storage position in phantom lines;

FIG. 7 is a side elevation view similar to FIG. 6 showing the flag further along its actuation path toward the flagging position; and, FIG. 8 is a perspective view of a scent pad for attachment to the deer attracting apparatus, as shown, for example, in FIG. 7.

Corresponding reference characters indicate corresponding parts throughout the several views. Like reference characters tend to indicate like parts throughout the several views.

DETAILED DESCRIPTION

Figure 1:
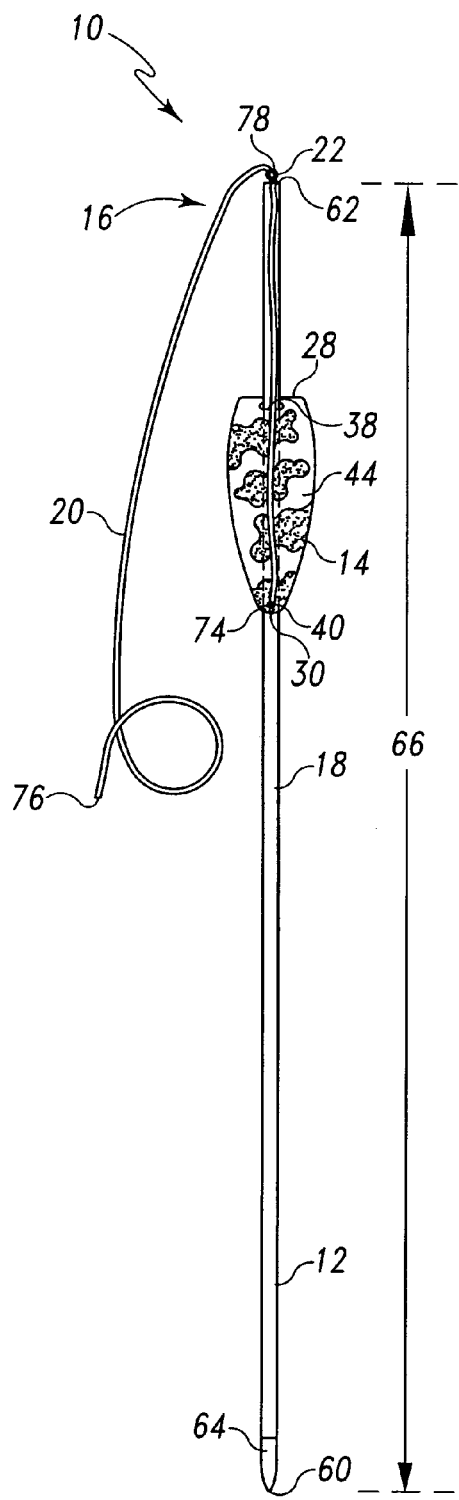
FIG. 1 is a perspective view of the deer attracting apparatus of the present invention showing a deer-tail shaped device or flag in a unactuated or repose position coupled to a pole acting as a mount and a line acting as an actuator coupled near the tip of the flag and running through a guide located adjacent the top end of the pole.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

As shown, for example, in FIGS. 1-7, the disclosed deer attracting apparatus 10, 110 includes a mounting structure 12, a deer tail-shaped device 14 and an actuator 16. Since deer tail display is typically referred to as flagging, the deer tail-shaped device 14 will also be referred to herein as a flag 14. In the illustrated embodiment, the flag 14 is mounted to a pole 18 and is actuated by a hunter pulling on a line 20 passing through a guide 22 on the top end 62 of the pole 18 and coupled adjacent to the tip 30 of the flag 14. The flag 14 is formed from a flexible material 42 and mounted to the mounting structure 12 for movement relative thereto when actuated by the actuator 16. When actuated, the flag 14 curls upwardly to expose the underside 26 of the flag 14 in a motion simulating the motion of a deer raising its tail. While described as curling upwardly, it is within the scope of the disclosure for the flag 14 to pivot upwardly to expose the underside 26 of the flag 14.

In the illustrated embodiment, the flag 14 includes an outer side 24, an underside 26, a base 28, a tip 30, side edges 32, 34, a longitudinal axis 36, a mounting location 38 and an actuator mounting location 40. The illustrated flag 14 is formed in part from a flexible, stretchable resilient material 42 such as rubber. Illustratively the flag 14 is fabricated by cutting or stamping the desired shaped from a sheet of synthetic rubber having a thickness of approximately one-sixteenth of an inch. It is also within the scope of the disclosure for the flag 14 to be fabricated from other flexible materials such as, natural or artificial rubbers, leather, suede, felt or other fabric or the like, fabric coated neoprene, polypropylene or other plastic materials. While the illustrated flag 14 is cut from or stamped out of a sheet of rubber, it is within the scope of the disclosure for the flag 14 to be molded to the desired shape so that the thickness of the flag 14 can vary in different locations.

As previously stated, the flag 14 includes an outer side 24 and an oppositely facing underside 26. In the illustrated embodiment, the outer side 24 includes a camouflage pattern appropriate for the environment of the hunting grounds. The camouflage pattern is preferably supplied by flexible camouflage tape 44 of the desired pattern being applied to the surface of the outer side 24 of the flag 14. It is within the scope of the disclosure for a camouflage pattern to be painted onto the flexible material 42 of the outer surface 24 of the flag 14 or for the flag 14 to be fabricated from multicolored flexible materials that generate a camouflage pattern. It is also within the scope of the disclosure for the outer side 24 of the flag 14 to have a color and/or texture simulating the outer side of a deer's tail. Thus, fur may be applied to the outer side 24 of the flag 14 within the scope of the disclosure. The outer side 24 of the flag 14 may be other colors and textures within the scope of the disclosure.

The underside 26 of the flag 14 is preferably colored and textured to simulate the underside of a deer's tail. Thus a material 46 having a color and texture simulating the underside of a deer's tail may be applied to the underside 26 of the flag 14 or the flag 14 may be fabricated in part from such material 46. In the illustrated embodiment, cotton is secured to the underside 26 of the flag 14 to mimic the appearance of the underside of a deer's tail. It is also within the scope of the disclosure for other materials having the desired color and/or texture to be present on the underside 26 of the flag 14. For instance, fur from a deer or other appropriately colored animal may be present on the underside 26 of the flag 14.

In the illustrated embodiment, the base 28 is a straight edge and the side edges 32, 34 extend away from opposite sides of the base 28 and taper toward the longitudinal axis 36 to meet at the tip 30. The base 28 and edges 32, 34 are shaped to conform generally to the shape of a deer's tail and are formed generally symmetrical about the longitudinal axis 36. In the illustrated embodiment, the flag 14 has a maximum width 48 at the base 28 and a length 50 from the base 28 to the tip 30. Illustratively, the length 50 is approximately twelve to sixteen inches while the maximum width 48 is approximately six inches.

Those skilled in the art will recognize that the size and configuration of the flag 14 may vary within the scope of the disclosure. For example, the disclosed device 10 may also be utilized to attract predators of deer, such as coyote. While the disclosed device 10 includes a flag 14 configured to simulate a does tail to attract bucks, when used to attract predators of deer, the flag 14 may be configured to simulate a fawn's tail since they are more often preyed upon by predators than adult deer. When the flag is configured to simulate a fawn's tail, length 50 would be approximately six inches while maximum width 48 would be approximately three inches. Also, when utilized to simulate a fawn's flagging activity, the flag 14 would generally be mounted lower on the pole 18 than described herein to replicate the height of a fawn's rear quarters.

In the illustrated embodiment, the mounting location 38 is a hole 38 extending through the flexible material 42 of the flag 14 located adjacent the base 28. The hole 38 is centered about a focus 52 located on the longitudinal axis 36 and displaced from the base 28 by a displacement 54. In the illustrated embodiment, the displacement 54 of the focus 52 from the base 28 is approximately two inches. The mounting hole 38 has a diameter 56 which is approximately equal to, or preferably slightly smaller than, the diameter 72 of the pole 18 adjacent the stop 68. The flexible material 42 from which the flag 14 is fabricated allows the mounting hole 38 to be stretched slightly when mounting the flag 14 on the pole 18. The resiliency of the flexible material 42 allows the mounting hole 38 to constrict about the pole 18 after stretching so that actuation of the flag 14 does not induce the flag 14 to slide upwardly along the pole 18. It is within the scope of the disclosure for the mounting location 38 to be a slit formed in the flag 14 or some other structure facilitating coupling the flag 14 to the pole at the desired location. It is also within the scope of the disclosure for the flag 14 to be reinforced adjacent the mounting location 38 by stitching, patching material or additional rubber to inhibit the flag 14 from ripping or tearing during attachment to the pole 18 or in use.

The actuator mounting location 40 is adjacent the tip 30. Illustratively, the actuator mounting location 40 is positioned along the longitudinal axis 36 at a displacement 58 from the tip 30. In the illustrated embodiment, the displacement 58 is one half inch. It is within the scope of the disclosure for the actuator mounting location 40 to be positioned closer to, farther away from, or even at the tip 30. In the illustrated embodiment, the actuator mounting location 40 is a hole 40 formed through the flexible material 42 from which the flag 14 is formed. The hole 40 is sized to receive the end of the actuator 16 therethrough. Other structures may be used within the scope of the disclosure to facilitate coupling the actuator 16 to the flag 14 adjacent the tip 30 such as a hook, an eyelet, a barb or the like.

In one illustrated embodiment, the mounting structure 12 comprises a pole 18 having a first end 60 and a second end 62. The first end 60 is configured for insertion into the soil. In the illustrated embodiment, a pointed steel barb 64 is located on the first end 60 of the pole 18 to facilitate insertion of the pole 18 into the ground. It is within the scope of the disclosure for the first end 60 of the pole 18 to be pointed or for other structures to be provided at the first end 60 of the pole 18 to facilitate locating the deer attracting apparatus 10 at a desired location in the hunting grounds. The second end 62 is configured to receive a portion of the actuator 16. The illustrated pole 18 has a length 66 of approximately five feet. A stop 68 is mounted to the pole 18 in a location displaced from the second end 62 to facilitate proper positioning of the flag 14. In the illustrated embodiment the displacement 70 of the stop 68 from the second end 62 is approximately twelve inches, as shown, for example, in FIG. 7. The pole 18 has a diameter 72 adjacent the stop 68 that is approximately equal to the diameter 56 of the mounting hole 38 of the flag 14.

Thus, when flag 14 is mounted to the pole 18 so that the mounting hole 38 on the flag 14 is positioned adjacent the stop 68, the tip 30 of the flag 14, when in the repose position is approximately three feet above the bottom end 60 of the pole 18. When the bottom end 60 of the pole 18 is inserted into the ground sufficiently to provide stability to the pole 18, the tip 30 of the flag 14 is positioned above the ground about the same distance as the tip of the tail of a mature doe would be positioned above the ground.

An illustrated alternative embodiment of the deer attracting apparatus 110, is configured to facilitate portability. Deer attracting apparatus 110 is similar to deer attracting apparatus 10 so similar reference numerals will be used to identify similar parts and identical reference numerals will be used to identify substantially identical parts. The mounting structure 12 of deer attracting device 110 is a pole 118 configured to include a telescoping mechanism 121, as shown, for example, in FIGS. 6 and 7. In the telescoping pole 118, a bottom pole section 117 is received for longitudinal movement within an upper pole section 119 to move between a plurality of extended use positions (one of which is shown in solid lines in FIG. 6) and a retracted storage position (shown in phantom lines in FIG. 6). The height at which the flag 14 of the deer attracting apparatus 110 is positioned may be altered by limiting the extent that the bottom pole 117 is extended with regard to the upper section 119. Alternatively, a plurality of telescoping pole sections may be combined to further reduce the length of the pole 118 when it is in the storage position. It is also within the scope of the disclosure for the a pole to comprise a plurality of sections configured to mate with one another when in a use configuration and configured to disconnect from one another when in a storage configuration.

In the illustrated embodiment, the actuator 16 is a line 20 coupled at one end 74 to the flag 14 near the tip 30 and runs through a guide 22 located adjacent the top end 62 of the pole 18, 118. The free end 76 of the line 20 is manipulated by the hunter to bring the line 20 taught prior to initiating the flagging movement of the flag 14. In the disclosed embodiment, the guide 22 is an eye screw 78 screwed into the top end 62 of the pole 18, 118 and the line 20 is run through the eye. The illustrated line 20 is low visibility line such as monofilament fishing line. It is within the scope of the disclosure for the line 20 to include a low visibility portion extending from the guide 22 to the mounting point 40 near the tip 30 of the flag 14 and a higher visibility portion extending to the free end 76 of the line 20. It is within the scope of the disclosure for additional line to be tied or otherwise coupled to the line 20 to enable the hunter to set up in a perch, tree stand, blind or other location remote from the device 10, 110.

The flag 14 is mounted to the pole 18, 118 between adjacent the stop 68 located between the first end 60 and the second end 62 for movement relative to the pole 18, 118. The line 20 of the actuator 16 is threaded through the guide 22 with the first end 74 secured to the actuator mounting location 40 adjacent the tip 30 of the flag 14. When so assembled, actuation of the line 20, for example, by the hunter pulling on the free end 76 of the line 20, causes the tip 30 of the flag 14 to curl upwardly to expose the underside 26 of the flag 14 in the direction facing away from the pole 18, 118.

In use, the hunter transports the deer attracting device 10, 110 to a desirable hunting location. Because of the simplicity of the design of the deer attracting device 10, 110, it is lightweight and easily transportable. If deer attracting device 110 is being utilized by the hunter, the pole 118 will typically be in the retracted storage position during transportation. Once the hunter reaches a desirable location in the hunting grounds, a location is selected for placing the deer attracting device 10, 110. The ground engaging end 60 of the pole 18, 118 is inserted into the ground at the desirable location for attracting deer. If the deer attracting device 110 is being utilized, the pole 118 may be extended to a use position either prior to insertion of the ground engaging end 60 in the ground or afterwards. After insertion, pole 118 may be further extended or retracted to place the flag 14 at a height above the ground approximating the height of a deer's hind quarters. Before or after inserting the pole 18, 118 in the ground, the hunter may apply a liquid scent 80 for attracting deer, such as urine of a deer in heat, to the absorbent material 46 attached to the underside 26 of the flag 14, as shown, for example, in phantom lines, in FIG. 2. Alternatively, the hunter may attach a scent pad 82 to the pole 18, 118, as shown, for example, in FIG. 7, or may attach a bag containing scented material. The hunter then extends the line 20 of the actuator 16 and manipulates the free end 76 of the line 20 from a desirable shooting location.

A scent pad 82 for attachment to the deer attracting device 10 is shown, for example, in FIG. 8. The scent pad 82 includes a body portion 88 formed to include a hole 90 therethrough to facilitate mounting the scent pad 82 to the device 10. A finger 92 extends from the body portion 88 of the scent pad 82 as shown, for example, in FIG. 8. The illustrated finger 92 is sized to be received in a scent bottle so that scent can be absorbed by the finger 92. Thus, finger 92 has a width 94 that illustratively is less than the diameter of the opening of the mouth of a scent bottle. Illustratively, scent pad 82 is fabricated from an absorbent material such as felt.

As shown, for example, in FIG. 7, sent pad 82 is mounted to the pole 18, 118 of the deer attracting device 10, 110 below the mounting location of the flag 14. In the illustrated embodiment, a string 86 extends through the hole 90 in the body portion 88 of the scent pad 82 and is tied to a mounting hook 84 coupled to the pole 18, 118. The scent pad is disposed in a position relative to the flag 14 so that actuation of the flag 14 fans the scent pad 82.

Figure 2:
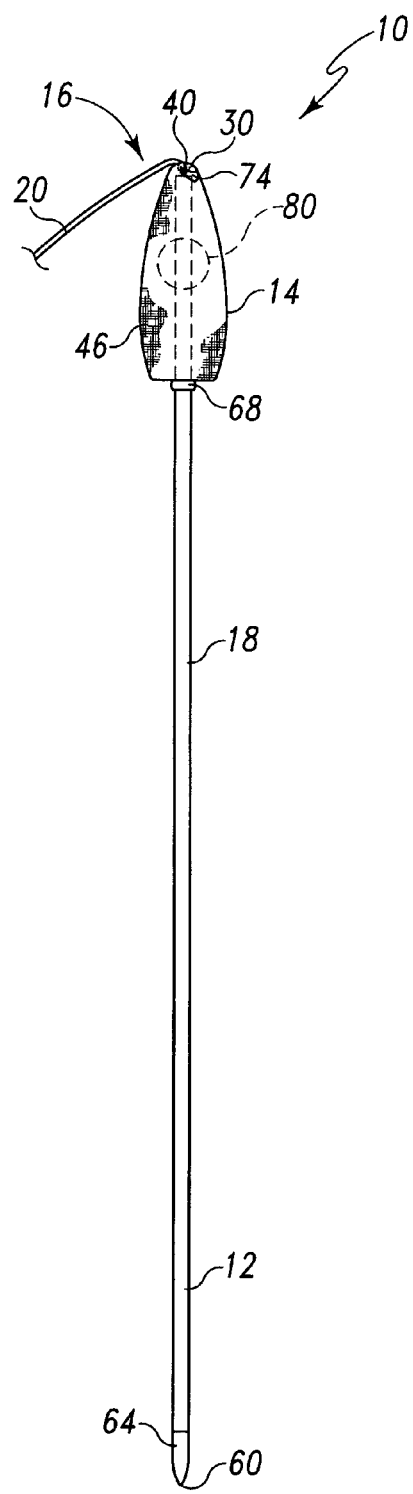
FIG. 2 is a perspective view of the deer attracting apparatus of FIG. 1 showing the flag in an actuated or flagging position revealing the underside of the flag.
Figure 4:
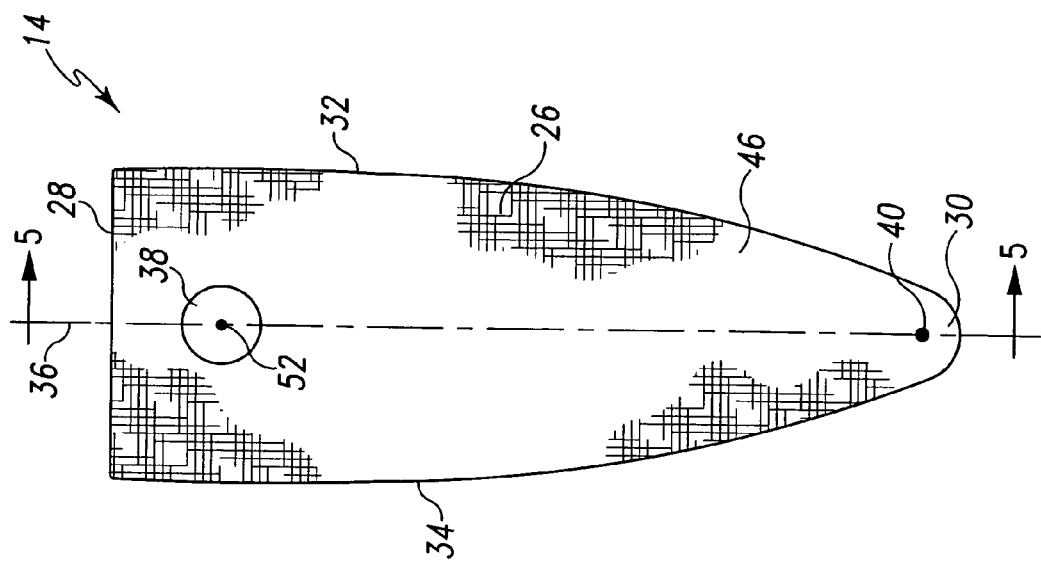
FIG. 4 is a plan view of the underside flag of FIG. 1.
Figure 3:
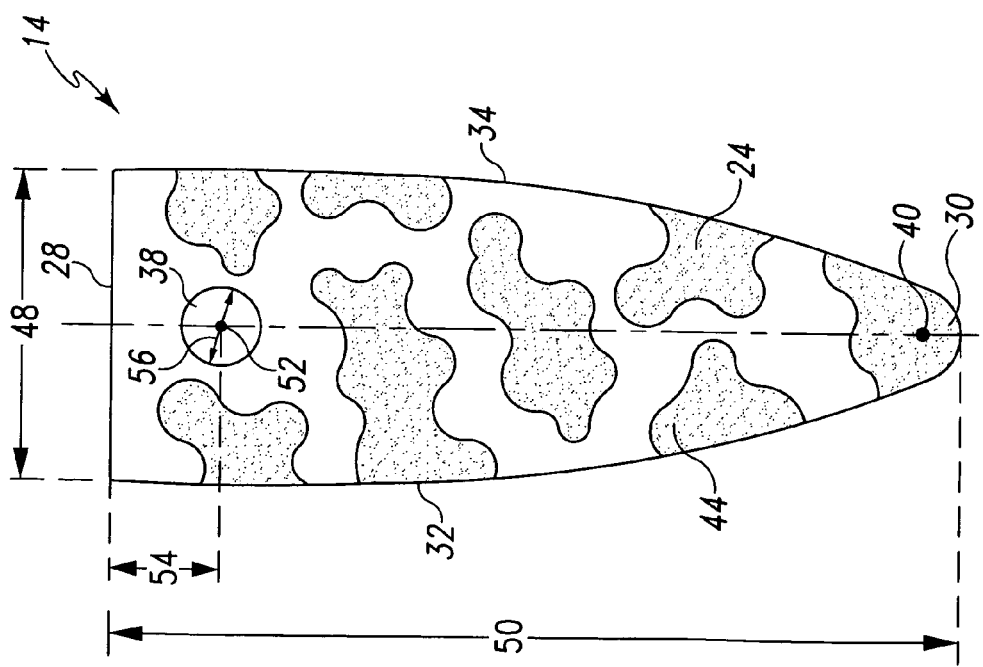
FIG. 3 is a plan view of the outer side of the flag of FIG. 1.

When the line 20 is not taut, the flag 14 assumes its unactuated or repose position (as show, for example, in FIG. 1) hanging from the pole 18, 118 with its tip 30 facing downwardly, the underside 26 facing toward the pole 18, 118 and the outer side 24 facing away from the pole 18, 118 toward a direction from which a deer is to be attracted (generally out of the paper in FIGS. 1 and 2 and generally to the right in FIGS. 6 and 7).

Through manipulation of the free end 76 of the line 20 (either directly or through an additional actuating device attached to the free end 76), the hunter causes the line 20 to become taut. As the line 20 becomes taut, the tip 30 of the flag 14 begins to curl upwardly from its repose position, as shown, for example, in FIG. 6. Pulling on the line 20 more induces the tip 30 to curl farther upwardly, as shown, for example, in FIG. 7. During the curling action, the outer side 24 of the flag 14 adjacent the tip portion is induced to face the outer side 24 of portions of the remainder of the flag 14 and the underside 26 of the flag 14 adjacent the tip portion is presented toward the desired direction, as shown, for example, in FIGS. 6 and 7. When the line 20 is pulled as far as the configuration of the device 10, 110 permits (either as the result of the size of the flag 14 or a stop (not shown) on the line 20 engaging the guide 22), the flag 14 assumes the flagging position, as shown, for example, in FIG. 2, with the underside 26 exposed toward the desired direction of attraction. The hunter may then allow the line 20 to go slack allowing the flag 14 to return to the repose position. The hunter may then repeat the actuation of the flag 14. Repeated actuation of the flag 14 has the additional benefit of fanning the scent pad 82 mounted to the pole 18 adjacent the repose position of the flag 14. During this process, the hunter may use deer calls to further aid in attracting deer.

Although specific embodiments of the invention have been described herein, other embodiments may be perceived by those skilled in the art without departing from the scope of the invention as defined by the following claims.

What is claimed is:

1. A deer attracting apparatus comprising:
   a mount;
   a flexible flag including a tip, a mounting location, an outer side and an underside, the flexible flag being configured to resemble the shape of a deer's tail when viewed from the underside and being mounted at the mounting location to the mount;
   an actuator coupled to the flexible flag adjacent the tip;
   wherein the flag, mount and actuator are configured to induce the flag to hang from the mount with the tip downward so that the outer side is presented toward a desired direction when the actuator is not actuated and during actuation of the actuator, the tip of the flag moves upwardly in a curling fashion that induces the outer side of the flag adjacent a tip portion to face the outer side of portions of the remainder of the flag and the underside of the flag adjacent the tip portion to be presented toward the desired direction.

2. The apparatus of claim 1 wherein the underside of the flag includes a textured material mimicking the under side of a deer's tail.

3. The apparatus of claim 2 wherein the textured material is absorbent and is impregnated with a scent.

4. The apparatus of claim 2 wherein the outer side of the flag exhibits a camouflaged appearance.

5. The apparatus of claim 4 wherein camouflage tape is applied to the outer side of the flag.

6. The apparatus of claim 2 wherein the actuator includes a low visibility line coupled to the tip of the flag.

7. The apparatus of claim 6 wherein the actuator includes a guide mounted above the mounting location of the flag on the mount through which the low visibility line is guided during actuation of the flag.

8. The apparatus of claim 2 wherein the mount is a pole.

9. The apparatus of claim 8 wherein the pole comprises a first portion and a second portion which are configured to assume a storage configuration and a use configuration such that the length of the pole in the storage configuration is shorter than the length of the pole in the use configuration.

10. The apparatus of claim 9 wherein the first portion is telescopically mounted to the second portion for reciprocal longitudinal movement relative to the second portion between the use configuration and the storage configuration.

11. A deer attracting apparatus comprising:
   a pole having a ground engaging end configured for insertion into soil, a top end displaced from the ground engaging end when the pole is in a use configuration by a length greater than the height of a deer's hind quarters and a stop disposed between the ground engaging end and the top end at a height about the ground engaging end approximating the height of a deer's hind quarters when the ground engaging end is received in the soil;
   a flexible flag including a tip, a mounting location, an outer side and an underside, the flexible flag being configured to resemble the shape of a deer's tail when viewed form the underside and being mounted at the mounting location to the pole adjacent the stop, the underside includes a material having a texture and color simulating the texture and color of a deer's tail;

an actuator comprising a guide mounted adjacent the top end of the pole and a line coupled at a first end adjacent the tip of the flag and a free end located remotely from the pole wherein between the free end and the first end, the line is guided by the guide; and wherein the flag, pole and actuator are configured to induce the flag to hang from the pole with the tip downward so that the outer side is presented toward a desired direction when the actuator is not actuated and during the actuation of the actuator, the tip of the flag moves upwardly in a curling fashion that induces the outer side of the flag adjacent a tip portion to face the outer side of portions of the remainder of the flag and the underside of the flag adjacent the tip portion to be presented toward the desired direction.

12. The apparatus of claim 11 wherein a portion of the line extending between the guide and the first end is low visibility line.

13. The apparatus of claim 11 a scent associated with the device.

14. The apparatus of claim 13 wherein the flag includes an absorbent material and the scent is a liquid absorbed by the absorbent material.

15. The apparatus of claim 14 wherein the absorbent material is the material having a texture and color simulating the texture and color of a deer's tail.

16. The apparatus of claim 13 and further comprising a scent pad coupled to the pole including a scented material.

17. The apparatus of claim 14 wherein the pole is configured to assume a storage configuration wherein the length of the pole is less than the height of a deer's hind quarters.

18. A game attracting apparatus comprising:
a pole having a lower end and a top end displaced from the lower end;
a flag including a tip, a mounting location, an outer side and an underside, the flag being configured to resemble the shape and color of a deer's tail when viewed from the underside and being mounted at the mounting location to the pole at a location above the lower end;
an actuator coupled to the flag adjacent the tip of the flag; and
wherein the flag, pole and actuator are configured to induce the flag to hang from the pole with the tip downward so that the outer side is presented toward a desired direction when the actuator is not actuated and during actuation of the actuator, the tip of the flag moves upwardly so that the underside of the flag is presented toward the desired direction.

19. The apparatus of claim 18 wherein the actuator comprises a guide mounted adjacent the top end of the pole and a line, the line coupled at a first end adjacent the tip of the flag, the line further including a free end located remotely from the pole and wherein a portion of the line between the free end and the first end is guided by the guide.

20. The apparatus of claim 19 wherein the flag, mount and actuator are configured to move the tip of the flag upwardly in a curling fashion that induces the outer side of the flag adjacent a tip portion to face the outer side of portions of the remainder of the flag and the underside of the flag adjacent the tip portion to be presented toward the desired direction during actuation of the actuator.

* * * * *